US006329434B1

(12) United States Patent
Wen et al.

(10) Patent No.: US 6,329,434 B1
(45) Date of Patent: Dec. 11, 2001

(54) CATALYTIC PARTIAL OXIDATION WITH IMPROVED IGNITION SYSTEM

(75) Inventors: Michael Yu-Hsin Wen, Katy, TX (US); Frank Hershkowitz, Liberty Corner; Robert Patrick Reynolds, Jr., Clinton, both of NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/545,789

(22) Filed: Apr. 7, 2000

Related U.S. Application Data

(60) Provisional application No. 60/137,473, filed on Jun. 4, 1999.

(51) Int. Cl.[7] .............................. C07C 27/00; C07C 5/13; C07C 1/02; C10G 35/00; C10G 35/04
(52) U.S. Cl. .................. 518/703; 518/700; 518/702; 585/734; 208/133; 208/134; 252/373
(58) Field of Search ................... 518/700, 702, 518/703; 585/734; 208/133, 134; 252/373

(56) References Cited

U.S. PATENT DOCUMENTS 5,023,276    6/1991    Yarrington et al. .................. 514/703

FOREIGN PATENT DOCUMENTS

| 0262947 | 4/1988 | (EP) | ............................... C01B/3/38 |
| WO99/19249 | 4/1999 | (WO) | ............................... C01B/3/00 |

OTHER PUBLICATIONS

Mercea, J., Grecu, E., Fodor, T., and Kreibik S. (Inst. Of Isotopic and Molecular Technology, Cluj–Napoca, Romania; "Catalytic Combustor for Hydrogen", Published Sep. 15, 1981; Int. J. Hydrogen Energy, vol. 7 No. 6, 1982, pp. 483–487.

La Ferla, R.; Tuffias, R. H. and Jang, Q.; "Monolithic Catalytic Igniters", Ultramet, Pacoima, California; AIAA 93–1905, AIAA/SAE/ASME/ASEE, 29th Joint Propulsion Conf. & Exhibit, Jun. 28–30, 1993.

Cohen, L.M. and Spencer, R. G; "A Robust Catalytic Igniter for $GH_2/GO_2$ Rocet Engines", Aerojet Propulsion Systems Plant, Sacramento, California, AIAA 95–2502, Jul. 10–12, 1995.

Green, James M., "A Premixed Hydrogen/Oxygen Catalytic Igniter", Sverdrup Technology, Inc., NASA Lewis Research Center Group, Cleveland, Ohio, Jun. 1989; NASA Contractor Report: 185113, AIAA–89–2302.

Johnson, R. J.; "Hydrogen–Oxygen Catalytic Ignition and thruster Investigation, vol. 1—Catalytic Ignition and Low Pressure Thruster Evaluations", TRW SystemsGroup, Redondo Beach, California, Report No.: NASA CR–120869, Nov., 1972, 214 pages.

"Hydrogen Generation From Natural Gas for the Fuel Cell Systems of Tomorrow", Andrew L. Dicks; British Gas plc., Gas Research Centre, Ashby Road, Loughborough, Leic. LE11 3QU, U.K.; Journal of Power Sources, CH, Elsevier Sequoia S. A. Lausanne; vol. 61, No. 1–2, Jul. 8, 1996, pp. 113–124.

*Primary Examiner*—Johann Richter
*Assistant Examiner*—J. Parsa
(74) *Attorney, Agent, or Firm*—Estelle C. Bakun

(57) ABSTRACT

The instant invention is directed to a catalytic partial oxidation (CPO) process with improved ignition comprising; (a) igniting an ignition feed comprising hydrogen, diluent and oxygen in a catalytic partial oxidation catalyst bed wherein said ignition feed has a predetermined adiabatic reaction temperature sufficient to cause said catalyst bed to ignite in a manner which prevents said catalyst bed from undergoing thermal shock, (b) modifying said ignition feed following said ignition of said catalyst bed to obtain a reaction feed comprising oxygen and hydrocarbon-reactant in a molar ratio capable of producing partial oxidation products in said catalyst bed under partial oxidation conditions, wherein said modification of said ignition feed is conducted to accomplish a predetermined heatup rate of said catalyst bed, and wherein the amount of diluent present during said modification is sufficient to control the adiabatic reaction temperature.

19 Claims, 1 Drawing Sheet

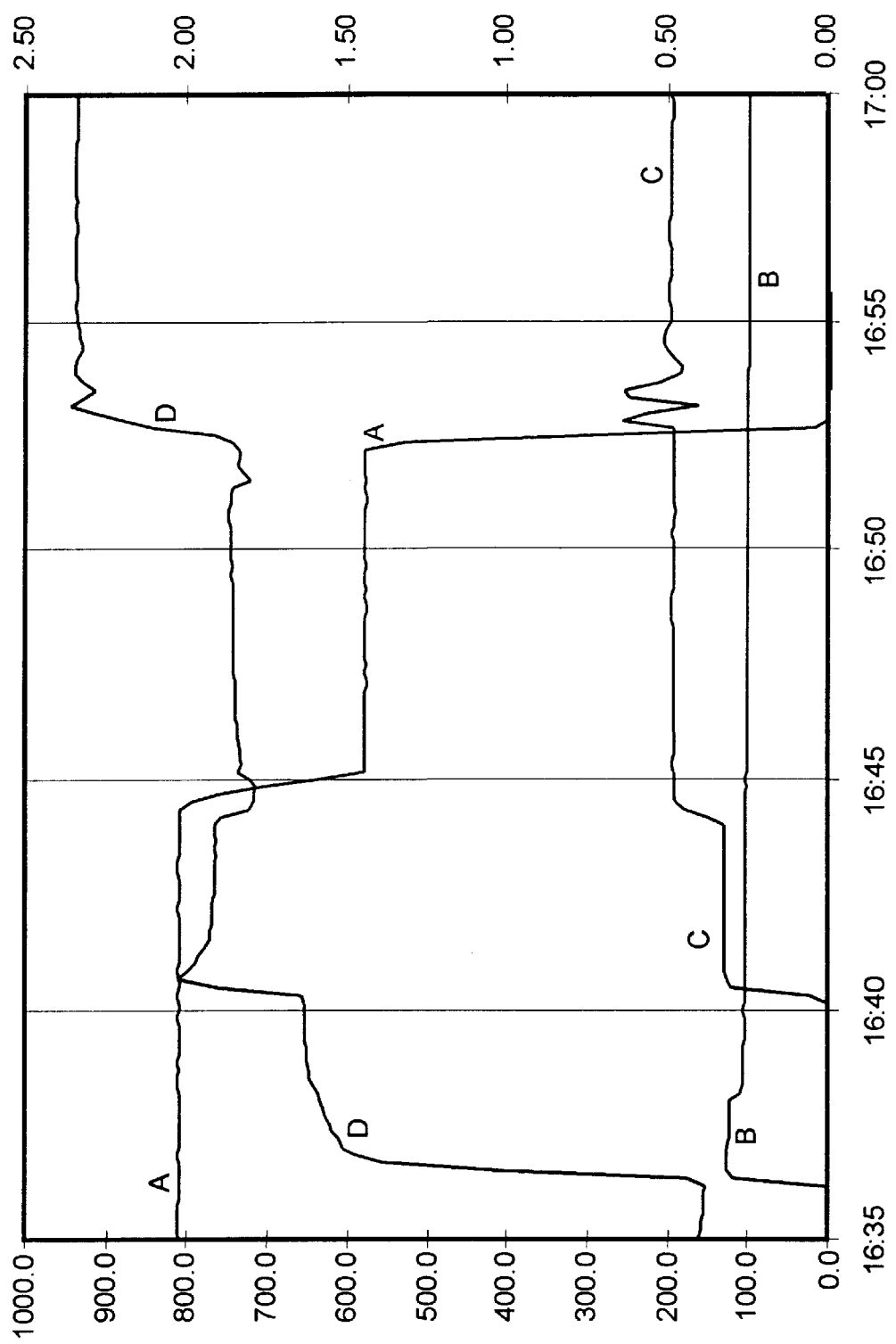
FIGURE

CATALYTIC PARTIAL OXIDATION WITH IMPROVED IGNITION SYSTEM

This application claims benefit of No. 60/137,473 filed on Jun. 4, 1999.

FIELD OF THE INVENTION

The present invention relates to an $H_2/O_2$ ignition system for igniting a catalytic partial oxidation (CPO) catalyst bed, preferably a CPO bed utilized for the production of synthesis gas.

BACKGROUND OF THE INVENTION

Catalytic partial oxidation (CPO) is a well known process utilized to produce synthesis gas from methane and oxygen. The CPO process seeks to eliminate gas phase partial oxidation reactions and utilizes a highly active Group VIII metal catalyst at high rate or low dwell time such that such reactions do not occur. Such processes require a special ignition means to heat the catalyst bed to a temperature at which ignition occurs, without heating the catalyst bed at such a rapid rate that the bed itself would be destroyed by thermal stresses. Conventional light-off procedures, such as a preheating torch or burner, utilized in other syngas generation systems are not practical for the CPO process. The reactor is too small to accommodate such equipment, and its design prevents the functioning of a torch. Therefore, what is needed in the art is a reactor lighting process which is capable of igniting the CPO catalyst bed without thermally stressing the bed.

SUMMARY OF THE INVENTION

The instant invention is directed to a catalytic partial oxidation (CPO) process with improved ignition comprising:

(a) igniting an ignition feed comprising hydrogen, diluent and oxygen in a catalytic partial oxidation catalyst bed wherein said ignition feed has a predetermined adiabatic reaction temperature sufficient to cause said catalyst bed to ignite in a manner which prevents said catalyst bed from undergoing thermal shock, (b) modifying said ignition feed following said ignition of said catalyst bed to obtain a reaction feed comprising oxygen and hydrocarbon-reactant in a molar ratio capable of producing partial oxidation products in said catalyst bed under partial oxidation conditions, wherein said modification of said ignition feed is conducted to accomplish a predetermined heatup rate of said catalyst bed, and wherein the amount of diluent present during said modification is sufficient to control the adiabatic reaction temperature.

BRIEF DESCRIPTION OF THE FIGURES

The FIGURE depicts a time/temperature flow rate graph illustrating the controlled variation in the temperature of a monolith heated by the combustion of gas mixtures which are varied gradually from low temperature start up mixtures to higher temperature syngas forming mixtures. The "X" axis is time, in hours:minutes. The left "Y" axis is temperature in degrees centigrade. The right "Y" axis is flow rates in units of standard cubic feet per minute (SCFM). Curve A is the flow rate for 10% H2 in N2, which has already been started at a time before the 16:35 beginning of this plot. Curve D is the temperature measured at a location downstream of the monolith. At a time of about 16:36, the oxygen (Curve B) is introduced. Curve C is methane added at 16:40. At a time around 16:52, the remaining H2/N2 is removed.

DETAILED DESCRIPTION OF THE INVENTION

CPO systems require a special means to light-off the catalyst bed due to the size constraints of such systems. Additionally, explosive mixtures can form and components within the reactor can be destroyed if the temperature is not closely controlled. Applicants have addressed all of these problems by utilizing an oxygen and hydrogen feed, with a diluent, to both ignite the catalyst bed of a CPO system, and control heatup in a manner that will not cause thermal stresses to the system. The instant light-off process affords several benefits. It requires no modification to existing CPO systems. It allows for easy control of the heat up rate of the system, thereby reducing thermal shock, and it allows for a smooth switching to the CPO product generating feed (herein called the reaction feed).

The modification of the ignition feed to form a reaction feed described in step (b) of the instant process may be conducted in a number of ways. Each way should be readily determinable by the skilled artisan depending on the starting composition of the ignition feed and the constraints of the CPO system utilized. The goal is to have controlled heat up of the system. The term reaction feed refers to the steady-state process feed that is reacted to produce CPO products. The term hydrocarbon-reactant is used herein to refer to the hydrocarbon-containing portion of the reaction feed.

Typically, the hydrogen will either be replaced or reduced. The diluent, depending on what it is may likewise be replaced or reduced. Oxygen may likewise, be increased. For example, in an ignition feed where hydrocarbon, e.g., methane, is used as the diluent in a sufficient quantity to form CPO products following ignition of the catalyst bed, the hydrogen would be reduced and the methane and oxygen would remain to form the reaction feed. If additional hydrocarbon and/or oxygen were required for the reaction feed, it would be added following ignition of the catalyst bed. If the diluent is other than hydrocarbon, the hydrogen and diluent would be replaced with sufficient hydrocarbon and additional oxygen, if needed, to form the reaction feed. It is not necessary to remove all of the hydrogen and diluent to run the instant process as some of the examples show. All that is necessary is that sufficient diluent be present during the modification of the ignition feed to achieve controlled heatup of the catalyst bed and that the ignition feed be modified to form a reaction feed capable of producing CPO products under CPO conditions. The transition to the reaction feed will be conducted in such a manner that the heatup of the system is controlled and does not thermally stress the system.

As used herein, thermal stress on the system occurs when any component in the system (e.g., insulation, monolith, etc.) becomes damaged due to excessive heatup rate. The point at which such thermal stress will occur is typically available from vendors of the monolith, etc.

In one embodiment, a stream comprising hydrogen and a separate stream comprising oxygen are fed to the reactor. Alternatively, the hydrogen and oxygen streams can be premixed to obtain a homogeneous stream. In either case, the oxygen and hydrogen will be a homogeneous mixture upon entering the catalyst bed. Preferably, the feeds will enter the reactor separately and be mixed prior to entering the catalyst bed. It is preferable to precondition the catalyst bed by flowing the stream comprising hydrogen over the catalyst bed prior to beginning the flow of the stream comprising oxygen, the combination of which two streams with diluent create the ignition feed. Typically, the streams will be preheated to a temperature of about 25 to about 600° C., preferably about 50 to about 300° C. The flow of oxygen results in instant ignition of the hydrogen on the catalyst bed. The ratio of $H_2:O_2$ in the ignition feed is not limiting, but it will typically be >2. Preferably, the ratio of $H_2:O_2$ in the ignition feed during ignition will be about 0.5 to about 20. Preferably, an equivalence ratio ($\Phi$), of >1, taking into consideration all combustibles in the ignition feed, will be utilized. Equivalence ratio is defined as the fuel/oxidant ratio in use, divided by the fuel/oxidant ratio at full combustion (i.e. perfect stoichiometry for $CO_2$ and $H_2O$ formation).

While the present application is directed toward catalytic partial oxidation, in which $\Phi>1$, it will be appreciated that one skilled in the art could adapt these methods to catalytic combustion systems that operate at fuel-lean equivalence ratios ($\Phi<1$).

The streams comprise hydrogen and oxygen, respectively, and each may additionally contain diluent. Diluents may be selected from multi-atomic gases, mono-atomic gases, or mixtures thereof. Multi-atomic gases are preferable.

The multi-atomic gases which are utilizable herein include, but are not limited to hydrogen, nitrogen, steam, methane, carbon monoxide, carbon dioxide, and higher hydrocarbons, e.g., ethane, propane, butane, etc., alcohols, olefins. The mono-atomic gases include helium, argon, etc. The only requirement for the diluent is that it allow for proper temperature control during ignition and modification to the reaction feed. Such diluents are readily determinable by the skilled artisan based on the heat capacity of the diluent selected. The lower the heat capacity, the higher the ignition temperature. Preferably, the diluent will be nitrogen or methane. Helium, though usable, is an inferior diluent and therefore requires close control of temperatures in the CPO catalyst bed. When the diluent is hydrogen, the amount of oxygen introduced to the system can be adjusted to maintain catalyst temperature. This is possible since additional hydrogen is present to react with additional oxygen. When hydrogen is utilized as a diluent, it is referred to herein as hydrogen as its own diluent.

The diluent may be fully or partially comprised of the hydrocarbon-reactant. When a diluent comprises components in addition to the hydrocarbon-reactant, the additional components can be reduced or replaced along with the hydrogen. It should be clear to the skilled artisan that hydrogen may still be present in the reaction feed either from the original ignition feed or as part of the hydrocarbon-reactant being utilized in the reaction feed. The diluent serves to limit the adiabatic reaction temperature upon ignition and to control heatup during modification of the ignition to the reaction feed.

The oxygen stream may likewise contain diluent and may additionally be introduced in the form of air. The only requirement is that the amount of oxygen contained in the ignition feed be sufficient to ignite the stream and also allow for controlled temperature heat up of the catalyst bed.

Once the system has been ignited, the hydrogen and diluent other than hydrocarbon, if present, are gradually replaced by a hydrocarbon-reactant, such as methane or another hydrocarbon. The supply of oxygen is maintained since it is a necessary component for partial oxidation. Once the hydrogen and diluent have been replaced to a desirable level, preferably completely, the CPO system operates in the normal manner and temperature control is maintained by the composition of the feed stream comprising hydrocarbon and oxygen. If sufficient hydrocarbon-reactant is present in the ignition feed, the hydrogen and other diluent are merely reduced without replacement by additional hydrocarbon-reactant.

One beneficial feature of the instant invention is that a hydrocarbon-reactant, such as methane used to generate synthesis gas, may likewise be utilized as diluent herein. In such a case, reduction, not replacement of the hydrogen may be performed.

The instant invention is particularly suited for CPO systems utilizing Group VIII metals as catalyst. The catalyst supports can be foam monolith, honeycomb monolith, highly porous pellets, or any other geometry or combinations that allow for low pressure drop and high thermal stability.

The ignition feed (hydrogen and oxygen mixture with or without diluent) is typically preheated to a temperature of about 25 to about 600° C., preferably about 50 to about 300° C. This temperature is herein called the preheat temperature. The catalyst bed, at times prior to ignition, will have a temperature approximately equal to the preheat temperature. Immediately after ignition, the hydrogen and oxygen of the ignition feed will be combusting on the catalyst to release heat and raise the temperature of the catalyst. The temperature that the catalyst system rises to after this combustion begins is herein called the ignition temperature.

The ignition feed contains a ratio of oxygen to hydrogen which ignites the catalyst bed to an ignition temperature ranging from about 100 to about 2000° C., preferably about 100 to about 1000° C., most preferably about 300 to 700° C. Typically, the molar ratio of hydrogen:oxygen will range from about 1:2 to about 20:1. One skilled in the art can readily determine the quantities of hydrogen, diluent, and oxygen necessary to control ignition of the system by calculating the adiabatic reaction temperature which is an approximation for the ignition temperature. The adiabatic reaction temperature will range from about 100 to 2000° C., preferably about 100 to 1000° C. and, most preferably about 300 to 700° C. Preferably, the amounts will be those necessary to ignite at the maximum temperature tolerable by the system. The diluent is added in an amount capable of controlling the adiabatic reaction temperature. The ignition temperature will be a temperature that will not thermally stress the CPO system. Once ignition is achieved, the hydrocarbon-reactant will gradually replace the hydrogen and diluent in a manner which controls and increases the adiabatic reaction temperature of the system up to a desired partial oxidation temperature. Thus, the present invention provides controlled ignition and heat up of the CPO system without the need for additional torches or other ignition apparatus by changing from an ignition feed to a reactive partial oxidation stream (reaction feed) by gradually discontinuing and/or replacing the supply of hydrogen/diluent with a synthesis gas generating mixture of hydrocarbon and oxygen.

Heatup rates and conditions to avoid thermal shock will be dependent on the specific reactor and catalyst being used. Thermal shock refers to the phenomena where a material is heated too quickly, causing mechanical damage. Such damage may arise from many sources, but commonly it is due to the high physical stresses imposed from the size changes associated with temperature changes. Thus, materials that are deformable (e.g., metals, plastics) are less easily shocked than brittle materials (e.g., ceramics), and systems with long length scales (e.g., large monolith blocks or reactor refractory linings) are more easily shocked than systems with small length scales (e.g., small catalyst particles). For example, a bench-scale 0.5-inch CPO monolith may be heated to about an 800° C. operating temperature in one ignition step lasting several seconds (e.g., 100° per second) while a large CPO commercial system may be heated up at about 100° per hour (possibly much slower during initial refractory curing).

For any given CPO system, the skilled artisan can readily determine heatup rates which will avoid thermal shock. The purpose of the present invention is to provide those operators with a method for igniting the catalyst bed while keeping the CPO system within their determined limits of heatup rates to avoid thermal shock.

Calculation of the adiabatic reaction temperature is well known to the skilled artisan. In practice, the skilled artisan will use a thermodynamics computer program to calculate this temperature with high precision. However, to illustrate the calculation process, the adiabatic reaction temperature for the hydrogen-oxygen combustion in a stream containing 0.5 moles $O_2$, 1.5 moles $H_2$, and 8 moles $N_2$, is demonstrated. First, one identifies which reagent is limiting. If $H_2:O_2<2$, it will be $H_2$ (otherwise $O_2$). Second, one computes the heat of combustion based on the limiting reagent. In this example, $H_2:O_2=3$, so $O_2$ is the limiting reagent, and heat of reaction is 116 kcal/mole-$O_2$*0.5 moles, =58 kcal (note that the heat of combustion based on limiting hydrogen concentration is half of 116, or 58 kcal/mole-$H_2$). Next, one computes the heat capacity of the diluent-containing combustion products. The combustion of 0.5 moles of $O_2$ will consume 1 mole of $H_2$ and produce 1 mole of $H_2O$, so the diluent-containing combustion product mixture has 1 mole of $H_2O$, 0.5 mole of $H_2$, and 8 moles of $N_2$. The heat capacity of such a mixture, averaged over the temperature range from 25–800° C., is about 7.5 cal/mole-°C. Thus, the temperature rise expected is the heat released divided by the heat capacity, or 58000/(7.5*9.5 moles), or about 810° C. If the feed was at a preheat temperature of 25° C., then the adiabatic reaction temperature of this mixture would be 835° C.

The hydrocarbon and oxygen reaction feed utilized in the instant invention to produce partial oxidation products need not be pure. The hydrocarbon-reactant stream being oxidized in the monolith after ignition may contain components other than the hydrocarbon component being oxidized. $H_2O$ and $CO_2$, may be present in the hydrocarbon stream introduced in relatively large amounts, such as from about 0.0 to 1.0 mol of $H_2O$ or $CO_2$ per carbon atom of hydrocarbon to be oxidized. Other components, for example, $H_2$, CO, Ar, $N_2$, $NH_3$, HCN, $H_2S$, COS, $CS_2$, organic sulfur-containing compounds, may be present in lower concentrations, typically less than 0.10 mole of the component per carbon atom of the hydrocarbon being oxidized. The stream comprising oxygen may likewise contain components other than oxygen. These components are typically $N_2$, $CO_2$, $H_2O$, and Ar. Some of these components, especially $N_2$, $CO_2$, and $H_2O$, may be present in major amounts, from 0.0 to 4.0 mole per mole of oxygen ($O_2$). Other components are typically present in lesser amounts, normally less than 0.1 mole of component per mole $O_2$.

Typical hydrocarbon feeds that are used in catalytic partial oxidation include methane, light ($C_2$–$C_4$) hydrocarbons, heavier ($C_5^+$) hydrocarbons, as well as olefins and oxygenates. More typically, saturated hydrocarbons are used as feed, and the partial oxidation products comprise synthesis gas, unsaturated hydrocarbons, oxygenated hydrocarbons, and combinations thereof. The partial oxidation products generated in the instant process can be recovered and utilized in further synthesis processing, such as Fischer Tropsch synthesis, methanol synthesis, hydrocarbonylation, polymerization, hydrogen separation, etc.

In one embodiment of the present invention, the principal component being oxidized is light hydrocarbon gas comprising methane, and the partial oxidation product comprises synthesis gas (syngas). It is known that successful operation of the catalytic partial oxidation process for the conversion of light hydrocarbon gases to synthesis gas requires high conversion of the hydrocarbon feedstock at high hourly space velocities, using preheated mixtures of, e.g., oxygen gas and methane in a preferred ratio of about 1:2, or 0.5, and under elevated pressures. Reference is made to Jacobs, et. al., U.S. Pat. No. 5,510,056 (Shell) for its disclosure of such a process.

Catalyst compositions suitable for use in the catalytic partial oxidation of hydrocarbons are known in the art. Preferred catalysts for use in the process of the present invention comprise as the catalytically active component, a metal selected from Group VIII of the Periodic Table of the Elements. Preferred catalysts for use in the process comprise a metal selected from nickel ruthenium, rhodium, palladium, osmium, iridium and platinum. The catalytically active metal may be used in metallic form, as in wire mesh or metal shot or metal monolith. If desired, one or more metals can be coated on or combined with other metals. The catalytically active metal may also be supported on suitable carrier materials well known in the art, including the refractory oxides, such as silica, alumina, titania, zirconia and mixtures thereof. Mixed refractory oxides, comprising at least two cations, may also be employed as carrier materials for the catalyst.

The catalytically active metal may be deposited on the refractory oxide carrier by techniques well known in the art. A most suitable technique for depositing the metal on the carrier is impregnation, which typically comprises contacting the carrier material with a solution of a compound of the catalytically active metal, followed by drying and calcining the resulting material.

In use in the process of the present invention, the catalyst is retained in the form of a fixed arrangement. The fixed arrangement may comprise a fixed bed of catalyst particles. Alternatively, the fixed arrangement may comprise the catalyst in the form of a monolith structure. The fixed arrangement may consist of a single monolith structure or, alternatively, may comprise a number of separate monolith structures combined to form the fixed arrangement. A preferred monolith structure comprises a ceramic foam. Suitable ceramic foams for use in the process are available commercially.

According to a further embodiment of the present invention, the formed useful syngas is cooled, recovered and treated for use in further synthesis processing. Such treatment may include purification to remove the low amounts of ammonia and hydrogen cyanide produced in the partial oxidation process. Suitable processes for removing ammonia and hydrogen cyanide from gaseous streams are well known in the art. The removal of ammonia and hydrogen cyanide may be effected in a single stage or in a plurality of stages. The cooling steps may be effected before or after the purification treatment steps, as appropriate to accommodate preferred temperatures of the treatment process. Small amounts of hydrogen may be separated out of the syngas for use in hydrocarbon upgrading stage.

The treated syngas may be used in processes that produce methanol and methanol based products, hydrocarbon synthesis (HCS) products such as liquid hydrocarbons, olefins, alcohols and aldehydes, oxo-synthesis products, ammonia and ammonia based fertilizers and chemicals, town gas and reduction gas used for the production of sponge iron, etc.

In a conventional HCS process, liquid and gaseous hydrocarbon products are formed by contacting the present syngas comprising a mixture of $H_2$ and CO with a suitable Fischer- Tropsch type HCS catalyst, under shifting or non-shifting conditions. Suitable Fischer-Tropsch catalysts comprise one or more Group VIII catalytic metals such as Fe, Ni, Co, Ru, and Re. In one embodiment, the catalyst comprises catalytically effective amounts of Co and one or more of Re, Ru, Fe, Ni, Th, Zr, Hf, U, Mg, La on a suitable inorganic support material, preferably one which comprises one or more refractory metal oxides. Preferred supports for cobalt-containing catalysts comprise titania, particularly when employing a slurry HCS process in which higher molecular weight, e.g., $C_{10+}$ products, primarily paraffinic liquid hydrocarbon products are desired.

The hydrocarbon products produced by an HCS process according to an embodiment of the present invention are typically upgraded to form suitable products such as, synthetic crude oil, liquid fuels (e.g., jet and diesel), a lubricating industrial or medicinal oil, waxy hydrocarbons, olefins (by, e.g., catalytic cracking or steam cracking). These processes are well known to those skilled in the art and need not be described here. All or a portion of the HCS products can be fractionated and then converted in one or more steps with or without a suitable catalyst or in the presence of hydrogen or both. Hydroconversion is usually preferred and includes mild hydrotreating (minimal branching) to make pumpable liquids, hydroisomerization (somewhat more branching, e.g., 25 to 85% and, preferably mono-methyl branching) for making distillates such as jet fuels and diesel fuels, and more severe hydroisomerization (where virtually all, e.g., less than 10 wt % and preferably less than 5 wt % of the feed remains unconverted) to make lube oils. These processes are also well known and reported in the literature insofar as catalysts and reaction conditions are concerned.

The instant invention which provides a cost-effective, safe way to ignite a CPO catalyst bed can be utilized in any system where a CPO catalyst bed is present.

The following Examples are illustrative and are not meant to be limiting in any way.

EXAMPLE 1

Equilibrium Calculation of Reactor Bed Temperatures During Simulated Ignition Sequence $H_2$ stream: 20% $H_2$ in $N_2$
$)_2$ stream: 25% $O_2$ in $N_2$
Reactor pressure: 25 atm
Preheat temperature: 100° C.

| Ignition with $H_2/O_2$, Diluted in Nitrogen | | | |
|---|---|---|---|
| Molar amounts | | | Adiabatic Reaction |
| $H_2$ | $O_2$ | $N_2$ | Temperature, ° C. |
| 1 | 0.0 | 5.0 | 100 |
| 1 | 0.1 | 5.4 | 353 |
| 1 | 0.2 | 5.8 | 564 |
| 1 | 0.3 | 6.2 | 743 |
| 1 | 0.4 | 6.6 | 897 |
| 1 | 0.5 | 7.0 | 1030 |

| Switching from $H_2$ to $CH_4$ | | | | |
|---|---|---|---|---|
| Molar Amounts | | | | Adiabatic Reaction |
| $CH_4$ | $H_2$ | $O_2$ | $N_2$ | Temperature, ° C. |
| 0.0 | 1.0 | 0.5 | 7.0 | 1030 |
| 0.1 | 0.9 | 0.5 | 6.5 | 996 |
| 0.2 | 0.8 | 0.5 | 6.0 | 955 |
| 0.3 | 0.7 | 0.5 | 5.5 | 909 |
| 0.4 | 0.6 | 0.5 | 5.0 | 864 |
| 0.5 | 0.5 | 0.5 | 4.5 | 835 |
| 0.6 | 0.4 | 0.5 | 4.0 | 823 |
| 0.7 | 0.3 | 0.5 | 3.5 | 820 |
| 0.8 | 0.2 | 0.5 | 3.0 | 821 |
| 0.9 | 0.1 | 0.5 | 2.5 | 826 |
| 1.0 | 0.0 | 0.5 | 2.0 | 833 |

Note, for Examples 2 to 6: The location of the thermocouple downstream measures the downstream temperature and is, therefore, an indicator of a change in temperature but not necessarily the adiabatic reaction temperature since the thermocouple may not be close enough to the catalyst bed to measure such.

EXAMPLE 2

Light-off of Rh Coated Monolith with Dilute $H_2$/$O_2$, and Switchover to Catalytic Partial Oxidation The FIGURE shows the flows and temperatures in a Rh-coated monolith during light-off. Curve A is the flow rate of the stream containing 10% $H_2$ in $N_2$, which has already been started at a time before the 16:35 beginning of this plot. Curve D is the temperature measured at a location downstream of the monolith, but in this example, fairly close to the monolith. At a time of about 16:36, the oxygen (Curve B) is introduced into the monolith, and the temperature rises to around 650° C. At a time around 16:40, methane (Curve C) is added to the stream entering the monolith and the temperature increases again, settling near 750° C. At a time around 16:45, a flow adjustment is made, increasing methane and decreasing $H_2/N_2$. Temperature shifts slightly, but remains near 750° C. At a time around 16:52, the remaining $H_2/N_2$ is removed. The temperature then increased to its final value near 950° C. A Table showing flows and conditions at typical times within each step is shown below The fluctuation in methane flow (Curve C) observed around 16:53 is an artifact of the flow control system for this specific experimental run, and is not related to the present invention.

| STEP | TIME | Reactor Pressure, psig | $O_2$ Flow, scfh | $CH_4$ Flow, scfh | $H_2/N_2$ Flow, scfh | Feed Preheat, ° C. | Monolith Exit, ° C. |
|---|---|---|---|---|---|---|---|
| 1. $H_2/N_2$ flowing | 16:35 | 21. | 0.00 | 0.00 | 2.03 | 137. | 160. |
| 2. $O_2$ added | 16:38 | 46. | 0.31 | 0.00 | 2.03 | 192. | 634. |
| 3. $CH_4$ added | 16:43 | 59. | 0.26 | 0.32 | 2.03 | 153. | 765. |
| 4. $CH_4$ increase $H_2/N_2$ decr. | 16:48 | 47. | 0.25 | 0.48 | 1.44 | 170. | 744. |

-continued

| STEP | TIME | Reactor Pressure, psig | $O_2$ Flow, scfh | $CH_4$ Flow, scfh | $H_2/N_2$ Flow, scfh | Feed Preheat, °C. | Monolith Exit, °C. |
|---|---|---|---|---|---|---|---|
| 5. $H_2/N_2$ removed | 16:56 | 41. | 0.25 | 0.49 | 0.00 | 202. | 938. |

Note: In this case the exit thermocouple was placed very close to the monolith exit, and gives a good reading of actual exit temperatures before cooling.

EXAMPLE 3

Hydrogen As Own Diluent

In this set of examples a stream of 90% $H_2$+10% Ar was used as diluent-containing hydrogen stream. The following flow/temperature history was obtained:

| Resulting→ Step: | $H_2$/Dil (slm) | $O_2$ (slm) | $CH_4$ (slm) | Downstream temperature, °C. | Notes/Feed Conditions | Adiabatic Reaction Temperature, °C. |
|---|---|---|---|---|---|---|
| 1. Start $H_2$/Ar | 56.5 | — | — | 92 | ~100° C. preheat, 1 atm | |
| 2. Add $O_2$ | 56.5 | 3.63 | — | 126 | | 1125 |
| 3. Increase $O_2$ | 56.5 | 4.29 | — | 220 | | 1288 |
| 4. Increase $O_2$ | 56.5 | 6.35 | — | 437 | | 1756 |
| 5. Add $CH_4$ | 56.5 | 6.35 | 4.16 | 515 | | |
| 6. Adjust $CH_4$ and $O_2$ | 56.5 | 4.82 | 4.16 | 601 | ~160° C. preheat | |
| 7. Increase $CH_4$, Decrease $H_2$ | | 4.82 | 8.17 | 497 | | |

This example gave good light-off performance. This example shows that hydrogen can be its own diluent. Light-off occurs in step 2 where the $H_2$:$O_2$ is 14 and the adiabatic reaction temperature is 1125° C.

Oxygen addition was continued post step 2 to increase exit temperature. The large quantity of $H_2$ present permitted temperature to continue increasing while a lower quantity of $H_2$ would have caused the additional $O_2$ to remain unreacted due to stoichiometric constraints.

EXAMPLE 4

In this example, a 20% H2/N2 stream was used for ignition with the following results:

| Resulting→ Step: | $H_2$/Dil (slm) | $O_2$ (slm) | $CH_4$ (slm) | Rxr Exit, °C. | Notes/Feed Conditions |
|---|---|---|---|---|---|
| 1. Start 20% $H_2/N_2$ | 15.4 | — | — | 210 | ~205° C. preheat, 19 psig |
| 2. Add $O_2$ | 15.4 | 2.1 | — | 305 | 29 psig |
| 3. Add $CH_4$ | 15.4 | 2.2 | 3.7 | 355 | 33 psig |
| 4. Increase $CH_4$, $O_2$ | 15.4 | 7.6 | 14.8 | 411 | 62 psig |
| 5. Drop 10% $H_2/N_2$ | — | 7.9 | 15.2 | 473 | 72 psig |

The post-mortem of the above monolith showed it to easily crumbled to powder. Microscopic examination of similarly-ignited monoliths revealed that the washcoat coating on the monolith appeared sintered. The adiabatic reaction temperature for the light-offs performed using the 20% $H_2/N_2$ would calculate to approximately 1410° C. Thus, it was concluded that light-off conditions that result in adiabatic temperatures that exceed the catalyst's capabilities (in this case at or above 1400° C.) are unacceptable.

EXAMPLE 5

Light-off with 10% $H_2/N_2$

The following is typical of a number of light-offs achieved with 10% $H_2/N_2$.

| Resulting→ Step: | $H_2$/Dil (slm) | $O_2$ (slm) | $CH_4$ (slm) | Rxr Exit, °C. | Notes/Feed Conditions |
|---|---|---|---|---|---|
| 1. Start 10% $H_2/N_2$ | 54.9 | — | — | 25 | ~25° C. preheat, 6 psig |
| 2. Add $O_2$ | 54.9 | 2.4 | — | 298 | 19 psig |
| 3. Add $CH_4$ | 54.9 | 2.8 | 3.0 | 355 | 24 psig |
| 4. Increase $CH_4$, Decrease $H_2$ | — | 2.8 | 6.0 | 310 | 1 psig |
| 5. Increase $CH_4$, $O_2$ | — | 12.0 | 24.0 | 686 | 14 psig |

The light-off occurs at step 2 with $H_2/O_2$=2.29. Switchover to hydrocarbon-reactant (methane) is essentially complete after step 4. The adiabatic reaction temperature calculated for step 2 is 706° C. This temperature is well within the materials limits of the monolith material, as indicated by post-mortem analysis on these monoliths, which did not show signs of sintering. This example shows that light-off can be accomplished without preheating the ignition feed.

EXAMPLE 6

Light-off with Methane Present at the Beginning

In this example, methane is mixed into the $H_2$ containing steam before the ignition step. Methane was used at a preset flow rate such that the desired methane/oxygen ratio is achieved when backing out the $H_2/N_2$ mix, with no additional adjustment needed. The hydrogen/diluent stream used in this example has a composition of 10% $H_2$ in $N_2$:

| Resulting→ Step: | $H_2$/Dil (slm) | $O_2$ (slm) | $CH_4$ (slm) | Rxr Exit, °C. | Notes/Feed Conditions |
|---|---|---|---|---|---|
| 1. Start 10% $H_2/N_2$ | 55.7 | — | 6.1 | 55 | ~55° C. preheat, 2 psig |
| 2. Add $O_2$ | 55.7 | 3.2 | 6.1 | 336 | 3 psig |
| 3. Increase $CH_4$, $O_2$ | 55.7 | 6.0 | 12.2 | 514 | 5 psig |
| 4. Drop 10% $H_2/N_2$ | — | 6.0 | 12.2 | 525 | 2 psig |

The light-off occurs at step 2 with $H_2/O2$=1.74. The adiabatic reaction temperature assuming only heat from the $H_2$ reaction is 702° C. Assuming all of the leftover $O_2$ fully combusts with methane, the resulting adiabatic reaction temperature is 773° C. In step 3, the methane and oxygen flow rates are adjusted to higher values before the step-4 removal of the $H_2/N_2$ diluent. This example demonstrates that hydrocarbon can be included in diluent during ignition.

The run was repeated reversing the order of steps 3 and 4 with the following results.

| Resulting→ Step: | $H_2$/Dil (slm) | $O_2$ (slm) | $CH_4$ (slm) | Rxr Exit, ° C. | Notes/Feed Conditions |
|---|---|---|---|---|---|
| 1. Start 10% $H_2/N_2$ | 54.9 | — | 6.1 | 70 | ~70° C. preheat, 2 psig |
| 2. Add $O_2$ | 55.7 | 3.0 | 6.1 | 404 | |
| 3. Drop 10% $H_2/N_2$ | — | 3.0 | 6.1 | 498 | |
| 4. Change $CH_4$, $O_2$ | | 3.6 | 6.1 | 580 | |

The light-off occurs at step 2 with $H_2/O_2=1.86$. The adiabatic reaction temperature assuming only heat from the $H_2$ reaction is 704° C. Assuming all of the leftover $O_2$ fully combusts with methane, the resulting adiabatic reaction temperature is 741 ° C. The above variation, in which the $H_2/N_2$ diluent was removed before the methane and oxygen flow rates were adjusted, worked equally well.

When hydrocarbon is included in the diluent during ignition, the calculation of adiabatic reaction temperature must take into account the presence of two reactants. If, under these conditions, the $H_2/O_2$ ratio is near or above 2.0 (as in the above examples), the impact of the hydrocarbon will be small, and the adiabatic reaction temperature can be calculated as if only hydrogen is combusting. When hydrocarbon is included in the diluent and the $H_2/O_2$ ratio is substantially below 2.0, the most conservative estimate of adiabatic reaction temperature is provided by first calculating the heat of combustion for the hydrogen present and then adding the heat of full combustion of any remaining oxygen with the hydrocarbon present.

What is claimed is:

1. A catalytic partial oxidation (CPO) process with improved ignition comprising;
    (a) igniting an ignition feed comprising hydrogen, diluent and oxygen in a catalytic partial oxidation catalyst bed wherein said ignition feed has a predetermined adiabatic reaction temperature sufficient to cause said catalyst bed to ignite in a manner which prevents said catalyst bed from undergoing thermal shock,
    (b) modifying said ignition feed following said ignition of said catalyst bed to obtain a reaction feed comprising oxygen and hydrocarbon-reactant in a molar ratio capable of producing partial oxidation products in said catalyst bed under partial oxidation conditions, wherein said modification of said ignition feed is conducted to accomplish a predetermined heatup rate of said catalyst bed, and wherein the amount of diluent present during said modification is sufficient to control the adiabatic reaction temperature.

2. The process of claim 1 wherein said diluent is selected from the group consisting of multi-atomic gases, mono-atomic gas, and mixtures thereof.

3. The process of claim 2 wherein said multi-atomic gases are selected from the group consisting of nitrogen, steam, methane, carbon dioxide, carbon monoxide, $C_2^+$ hydrocarbons, and mixtures thereof.

4. The process of claim 1 wherein said diluent is methane.

5. The process of claim 1 wherein said ignition feed is preheated to a temperature of at least about 25° C. to about 600° C.

6. The process of claim 1 wherein said hydrogen is completely replaced when modifying said ignition feed to form said reaction feed.

7. The process of claim 1 wherein hydrogen is flowed into said catalyst bed prior to said injection of said ignition feed.

8. The process of claim 1 wherein said hydrogen and oxygen are present in said ignition feed in a ratio of $H_2:O_2$ of about 0.5 to about 20.

9. The process of claim 8 wherein said ratio of $H_2:O_2$ in said ignition feed ignites said catalyst bed to an ignition temperature of about 100 to abut 2000° C.

10. The process of claim 1 wherein said diluent is hydrogen.

11. The process of claim 1 wherein said predetermined heatup rate of step b is about 10° C. per hour to about 100° C. per second.

12. The process of claim 1 wherein a synthesis gas is recovered from the process and said synthesis gas is contacted with hydrocarbon synthesis (Fischer-Tropsch) catalyst at hydrocarbon synthesis reaction conditions thereby producing liquid hydrocarbons.

13. The process of claim 12 wherein the hydrocarbon synthesis catalyst is a nonshifting catalyst.

14. The process of claim 13 wherein the product of the hydrocarbon synthesis is subjected to conversion.

15. The process of claim 14 wherein the conversion is catalytic.

16. The process of claim 15 wherein the conversion process comprises hydroisomerization.

17. The process of claim 16 wherein a diesel fuel, a jet fuel or a lube oil is recovered from the process.

18. The process of claim 14 wherein the conversion is non-catalytic.

19. The process of claim 18 wherein the conversion process is steam cracking.

* * * * *